(12) United States Patent
Zabetian (10) Patent No.: US 11,582,044 B2
(45) Date of Patent: Feb. 14, 2023

(54) SYSTEMS AND METHODS TO TIMESTAMP AND AUTHENTICATE DIGITAL DOCUMENTS USING A SECURE LEDGER

(71) Applicant: Mahboud Zabetian, Orinda, CA (US)

(72) Inventor: Mahboud Zabetian, Orinda, CA (US)

(73) Assignee: Mahboud Zabetian, Orinda, CA (US)

( * ) Notice: Subject to any disclaimer, the term of this patent is extended or adjusted under 35 U.S.C. 154(b) by 298 days.

(21) Appl. No.: 16/903,332

(22) Filed: Jun. 16, 2020

(65) Prior Publication Data

US 2020/0396087 A1 Dec. 17, 2020

Related U.S. Application Data

(60) Provisional application No. 62/862,590, filed on Jun. 17, 2019.

(51) Int. Cl.
*H04L 29/06* (2006.01)
*H04L 9/32* (2006.01)
*H04L 9/06* (2006.01)
*H04L 9/00* (2022.01)

(52) U.S. Cl.
CPC .......... *H04L 9/3247* (2013.01); *H04L 9/0643* (2013.01); *H04L 9/3236* (2013.01); *H04L 9/3297* (2013.01); *H04L 9/50* (2022.05)

(58) Field of Classification Search
CPC ... H04L 9/3247; H04L 9/0643; H04L 9/3236; H04L 9/3297; H04L 2209/38; H04L 63/126; H04L 2463/121; H04L 63/0876; H04L 9/3239

See application file for complete search history.

(56) References Cited

U.S. PATENT DOCUMENTS

| 9,300,678 B1 * | 3/2016 | Stack ................... G06F 21/645 |
| 10,181,948 B1 * | 1/2019 | Nenov ................ G06F 9/44505 |
| 10,361,866 B1 * | 7/2019 | McGregor ............ H04L 9/0637 |
| 2001/0033661 A1 * | 10/2001 | Prokoski ............... H04L 9/3297 |
| | | 713/168 |

(Continued)

FOREIGN PATENT DOCUMENTS

| FR | 3082023 A1 * | 12/2019 | ............. G06F 21/10 |
| TW | I708154 B * | 10/2020 | ............... H04L 9/50 |
| WO | WO-2012011509 A1 * | 1/2012 | ............. G06F 21/64 |

*Primary Examiner* — Sher A Khan
(74) *Attorney, Agent, or Firm* — IP Spring (57) ABSTRACT

Systems and methods to timestamp and authenticate digital documents using a secure ledger are described. Some implementations can include computer-implemented method to timestamp and authenticate electronic documents. The method can include receiving, by a timestamp and authentication server and from a user device, a unique hash value that is generated at the user device based on a source document and a device identifier of the user device, and verifying, by the timestamp and authentication server, the device identifier. The method can also include, upon verifying the device identifier, inserting, by the timestamp and authentication server, the hash value and the device identifier into a secure ledger, and upon successful insertion into the secure ledger, transmitting, from the timestamp and authentication server to the user device, a success status message including a location in the secure ledger where the hash value was inserted.

14 Claims, 6 Drawing Sheets

(56) References Cited

U.S. PATENT DOCUMENTS

| | | | |
|---|---|---|---|
| 2014/0229738 A1* | 8/2014 | Sato | H04L 9/3297 |
| | | | 713/178 |
| 2015/0012974 A1* | 1/2015 | Unitt | H04L 63/08 |
| | | | 726/4 |
| 2016/0283920 A1* | 9/2016 | Fisher | G06Q 20/065 |
| 2019/0044393 A1* | 2/2019 | Louis | H04B 5/0037 |
| 2019/0109834 A1* | 4/2019 | Lyons | H04L 63/08 |
| 2020/0159891 A1* | 5/2020 | Patel | H04L 9/3239 |
| 2021/0250177 A1* | 8/2021 | Yoo | G16Y 30/10 |

\* cited by examiner

SYSTEMS AND METHODS TO TIMESTAMP AND AUTHENTICATE DIGITAL DOCUMENTS USING A SECURE LEDGER

RELATED APPLICATIONS

This application claims the benefit of U.S. Provisional Application No. 62/862,590, entitled "Use of smartphones to provide simple and secure document authentication and timestamping," and filed on Jun. 17, 2019, which is incorporated herein by reference in its entirety for all purposes.

FIELD

Some implementations relate generally to electronic document timestamping and authentication, and more particularly to, systems and methods to timestamp and authenticate digital documents using a secure ledger such as a distributed ledger (e.g., blockchain).

BACKGROUND

Electronic or digital documents often have associated metadata that can indicate aspects about the document. For example, electronic documents are often tagged with digital timestamps, digital images can have EXIF tags that specify when they were taken or modified; e-mails have a date header, and text or other files on a computer can have a number of dates associated with the file such as creation date, modification date, or last opened date.

These time and place markers may be easily modifiable, using tools available to any slightly advanced computer user.

Due to this insecurity, documents and the ideas, creations, constructs, and contracts, implicitly or explicitly expressed within, may not be trustworthy, unless they undergo other processes to authenticate or verify the information.

Traditionally, notarization, sealed and stamped envelopes, printing in publications, have been some of the ways used to make up for a lack of trust in paper documents.

With the enormous growth in digital document creation, such as photographs and images, scanned documents, entirely digital contracts (from creation through execution), it is untenable to use traditional mechanisms to prove that trust. People have come to expect immediacy, and old technology and processes like faxes, notaries, and even printing documents, are passé and shunned.

In order to securely affix a time to a document, cryptographic techniques may be utilized, and results may be stored in a trusted system. This is a technical and complex process and may be beyond the skills of most people. Even those who can manage the complexity, would likely prefer not to seek out a desktop computer to use cryptographic mechanisms that require key management and identification.

Simplicity and convenience are lacking in available technology. What is also lacking is the trust that a document is the original; i.e. unaltered between its creation and the authentication. An image that is authenticated, could have been modified immediately before authentication. While this may be a desired action, such as when an artist makes modifications to their prior creation, and wishes to time-stamp it again, it is important to also consider the situation that is now known as "fake news": images that were modified in order to create false premises or accusations. Being able to certify that an image is unaltered between the camera and the authentication software, is a direly needed.

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

SUMMARY

Some implementations can include a method, computer readable medium, and/or system to timestamp and authenticate digital documents using a secure ledger.

Some implementations can include computer-implemented method to timestamp and authenticate electronic documents. The method can include receiving, by a timestamp and authentication server and from a user device, a unique hash value that is generated at the user device based on a source document and a device identifier of the user device, and verifying, by the timestamp and authentication server, the device identifier. The method can also include, upon verifying the device identifier, inserting, by the timestamp and authentication server, the hash value and the device identifier into a secure ledger, and upon successful insertion into the secure ledger, transmitting, from the timestamp and authentication server to the user device, a success status message including a location in the secure ledger where the hash value was inserted.

In some implementations, the source document includes an image that is obtained directly from a sensor of the user device such that the generated hash value is based on a raw image prior to any modification to the image by a user using the user device. In some implementations, the source document includes one or more of an image, a text document, computer software code, a video, a database, a location, biometric data, or a spreadsheet.

In some implementations, generating the hash value includes generating a cryptographic hash value that is unique to the source document such that no two source documents correspond to a same hash value. In some implementations, the secure ledger includes a blockchain distributed ledger.

In some implementations, inserting the hash value and the device identifier into the secure ledger comprises saving the hash value as a post to a public social media platform that maintains a respective timestamp for each post. In some implementations, verifying the device identifier includes transmitting, by the timestamp and authentication server, the device identifier to a third-party device identifier verification service, and receiving, by the timestamp and authentication server, a device identifier verification result from the third-party device identifier verification service.

In some implementations, verifying the device identifier includes sending a push notification to the user device, wherein the push notification contains a code, receiving a response code from the user device, and comparing the code with the response code, wherein the device identifier is verified if the code and the response code match and is unverified if the code and the response code do not match.

Some implementations can include a computer-implemented method comprising receiving, at a timestamp and authentication server from a user device, a digital document and a secure ledger receipt, and generating, by the timestamp and authentication server, a new hash value based on the digital document. The method can also include retrieving from a secure ledger, by the timestamp and authentication server, a stored hash value using the secure ledger receipt, and comparing the new hash value and the stored hash value, wherein the digital document is verified if the new hash value and the stored hash value match and is unverified if the new hash value and the stored hash value do not match.

The method can further include comprising providing a visual indication of document verification. In some implementations, providing visual indication of document verification includes causing a visual indicium to be displayed on the user device based on a result of the comparing.

Some implementations can include a system, comprising one or more processors coupled to a computer readable memory having stored thereon software instructions that, when executed by the one or more processors, cause the one or more processors to perform or control performance of operations. The operations can include receiving, from a user device, a unique hash value that is generated at the user device based on a source document and a device identifier of the user device, and verifying the device identifier. The operations can also include verifying the device identifier, and, upon verifying the device identifier, inserting the hash value into a secure ledger. The operations can further include, when the insertion into the secure ledger is successful, transmitting, to the user device, a success status message including a location in the secure ledger where the hash value was inserted.

In some implementations, the source document includes an image that is obtained directly from a sensor of the user device such that the generated hash value is based on a raw image prior to any modification to the image by a user using the user device. In some implementations, the source document includes one or more of an image, a text document, computer software code, a video, a database, or a spreadsheet.

In some implementations, generating the hash value includes generating a cryptographic hash value that is unique to the source document such that no two source documents correspond to a same hash value. In some implementations, the secure ledger includes a blockchain distributed ledger.

The operations can also include saving the hash value as a post to a public social media platform that maintains a respective timestamp for each post. In some implementations, verifying the device identifier includes transmitting the device identifier to a third-party device identifier verification service, and receiving a device identifier verification result from the third-party device identifier verification service.

In some implementations, verifying the device identifier includes sending a push notification to the user device, wherein the push notification includes a code, receiving a response code from the user device, and comparing the code with the response code, wherein the device identifier is verified if the code and the response code match and is unverified if the code and the response code do not match. In some implementations, the operations further include obtaining a timestamp from a time source, and wherein the inserting further includes inserting one or more of the timestamp or the device identifier into the secure ledger. In some implementations, the secure ledger includes a social network having a sequential stream of entries that cannot be altered or reordered.

DETAILED DESCRIPTION

Some implementations permit users with smartphones to create timestamped documents, to send contracts and legally binding or legally trusted documents to each other, and to enter into contracts and agreements, all with the simplicity of as few button taps as it takes today to take a photo and submit it to a social network, or to friends and family.

Some implementations can include software instructions executable on common smartphones (e.g., as a mobile application or app), such as an Apple iOS iPhone or Android devices, to provide a system offering:
 cryptographic fingerprinting;
 secure transmission to trusted services;
 identity authentication using passwords and/or biometrics;
 creation of documents for unaltered fingerprinting; and/or
 sensors providing data such as location or photographs for further security.

Smartphones, due to their convenience, simplicity, prevalence, and connectedness, provide a usable platform to address the problem of complex and difficult document timestamping, authentication, and certification.

A "subject document" or "source document" or SD, as used herein can include an electronic or digital document that can include one or more of: a snippet of text as typed by the user; a digital or electronic document (e.g., a text file, a PDF file, a spreadsheet, a database, etc.); a photograph or other digital or electronic image stored in a computer readable medium; a physical geographic location, usually stored as a coordinate pair, with optional altitude and movement data; any file that is stored on the smartphone (or other user device); any file that is sent to the smartphone (or other user device); representations of data that is being shared by other apps on that smartphone, or other document or file for which timestamping and/or authentication may be suitable. In some implementations, a subject or source document can include a user's current geographic location, a user's biometric data (e.g., fingerprint, facial recognition, etc.), or a combination of one or more of the above subject document types. Some implementations can timestamp subject documents such as the user's location or proof of the user's presence at their smartphone (optionally along with a given location), or a combination of two or more of the above subject or source document types.

A "software agent" (agent) is the software application (e.g., a mobile application or app) executing on a smartphone (or other user device) as part of a larger multi-node system.

The "trusted system" is a combination of a central system (e.g., including a server) that communicates with the agent, and also, either contains the trust mechanism, or communicates with the trust mechanism, to cause a task of trust determination to be performed by a third party.

A timestamp can include a unique fingerprint (or hash value) for a given SD. For example, the timestamp can include a cryptographic hash value, which uniquely identifies a document, and distinguish it from a very similar one that has been modified, even if that modification is even a single digital bit, or the deletion or addition of a single bit. In some implementations, the agent creates that fingerprint or hash value. Once that fingerprint is created, a trusted system is utilized to provide a temporal anchor—the time. The trusted system will be discussed in detail below.

The trusted system can provide a resultant link that, when coupled with the original SD, can be used to recreate the timestamp, and thus validate the SD as being the same exact one that was timestamped. Some implementations can include a means to prove that a given SD was in existence at a certain point in time.

In another example, in order to address the so-called "fake news" issue, a software mechanism can be used by the agent to acquire an image directly from the smartphone camera, without the opportunity for alteration, and provide an immediate timestamping. The agent will also have to utilize cryptographic features of the smartphone, in order to securely transfer that fingerprint to the trusted service, and also to allow for the trusted service to vet the agent (e.g., verify a user device identifier and/or agent software application identifier) to ensure that it is the true software agent counterpart of the trusted system. Other direct readings from smartphone sensors, such as the location sensors, can be authenticated similarly. This allows for an SD to be authenticated for its creation, and not just its existence, and also to be certified as being original.

Additionally, the agent can utilize a smartphone's user authentication, whether password based or biometric, to add authorship and ownership to the SDs' authentications.

For some SD, the disclosed timestamping can provide proof of creation, by an owner/author, and proof of lack of tamper or modification of the SD. For other SD, an implementation can provide proof of existence and ownership (at least temporally).

The trusted system mentioned above is partially a counterpart to the agent, in terms of communicating and SD validating. Some implementations can provide trusted time and verified unaltered temporal chronology, by creating a secure, and tamper-proof mechanism like a double-ledger accounting system. For example, the trusted system could accept the fingerprints from the agent, and then access a secure clock (e.g., from a secure time source such as GPS, atomic clock broadcasts, or network time) to get the current time, and enter the time and the fingerprint into a sequential list that the system then maintains in a secure location. Alternatively, the system could combine the trusted time with the fingerprint into a new cryptographic certificate and return the new cryptographic certificate to the agent for use by the user. One potential drawback with this combination is that the trusted system has to enclose and maintain the trust, which would need to be proven to users in order to gain their trust in the entire mechanism.

Alternatively, the trusted system can securely take data from the agent and submit the data to other systems that would maintain the trust in an existing sequential chronology of generic postings or transactions. This technique can permit the trusted system to provide a small amount of assurance and would have no access to the alteration of timestamps and fingerprints. Thus, the proof of trust can be pushed onto another existing, and already trusted, system.

In this latter scenario, there are a number of possibilities: the fingerprints could be submitted for printing in the Classified Ads of a newspaper, which are unalterable after printing. Alternatively, for a more responsive and immediate temporal anchor, the fingerprints can be sent as messages in a social network or the like (e.g., sent as tweets in Twitter, etc.) where the fingerprint messages enter a sequential stream that cannot be altered or reordered.

In some implementations, one technique can include insertion of the fingerprints into a distributed ledger such as a blockchain as transactions. Blockchains are considered unalterable and, consequently, are typically trusted mechanisms for maintaining ledgers. Lastly, by adding one or more smartphones to the system, with the agent installed, some implementations can provide end-to-end electronic document certification, allowing for certification of aspects such as:

an SD was sent to one or more parties;
the second party received the SD;
the second party viewed the SD;
the second party made modifications;
the second party tapped on a preconfigured UI item confirming that they read and understood the SD;
utilizing user authentication to allow the second party to "approve" or "accept" the document in a legally binding manner; and
allow for countering the second party's actions, by the first party, such as accepting modifications, countersigning a contract, or the like.

Figure 1:
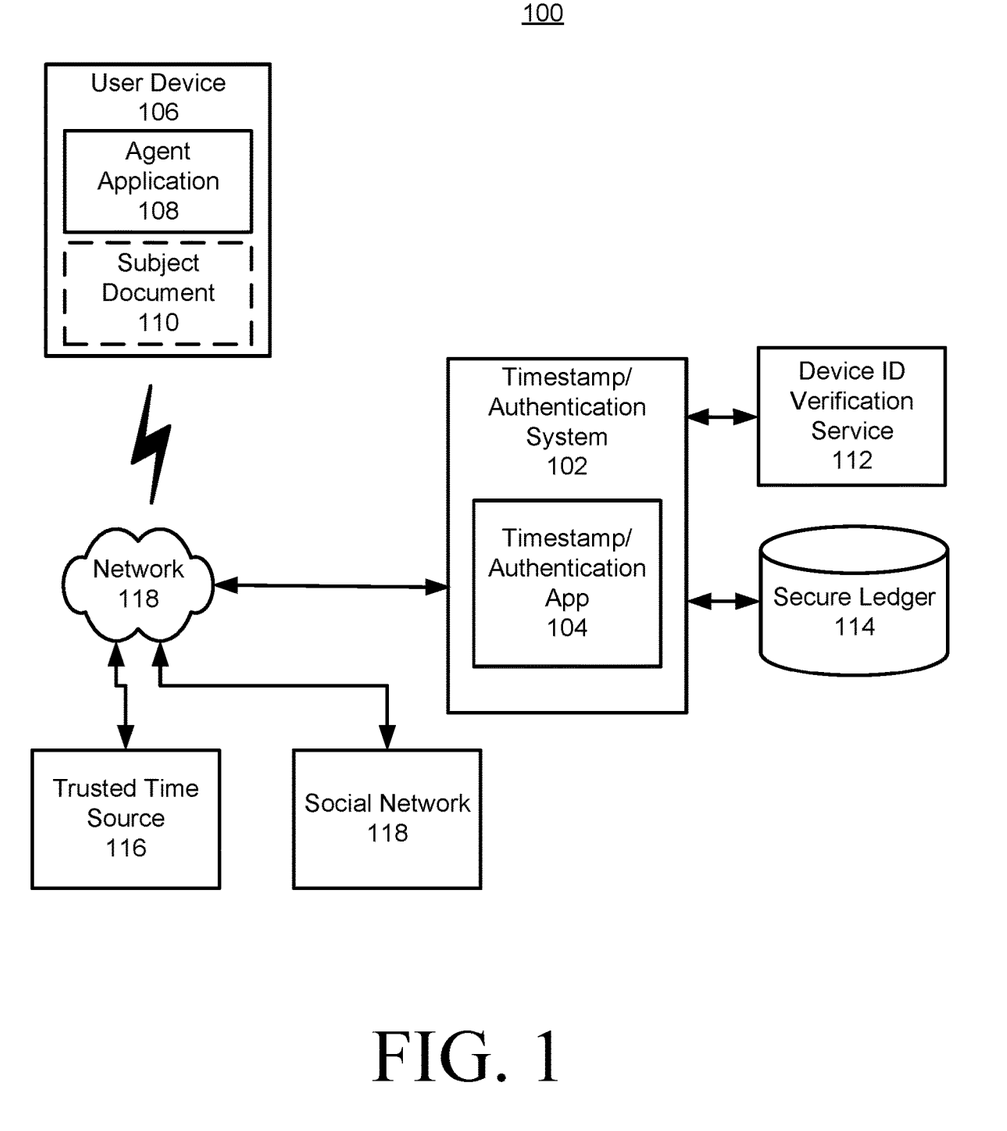
FIG. 1 is a diagram of an example electronic document timestamping and authentication environment, in accordance with some implementations.

FIG. 1 is a diagram of an example electronic document timestamping and authentication environment 100, in accordance with some implementations. The environment 100 includes a timestamp/authentication system 102 including a timestamp/authentication application 104, a user device 106 including an agent application 108 and a subject document (SD) 110. The user device 106 can connect to the timestamp and authentication server 102 via a network 118 (wired and/or wireless).

The timestamp and authentication server 102 connects to a trusted time source 116 (e.g., GPS, atomic clock, network, etc.), a device identifier (ID) verification service 112, and a secure ledger (e.g., a distributed ledger such as blockchain). The timestamp and authentication server 102 connects to a social network 118 (e.g., Twitter, Facebook, Instagram, etc.).

User device 106 and timestamp and authentication server 102 may be any type of computing device. Service 112 may be, e.g., an online service, that receives requests and verifies device identifiers. For example, such a service can provide an API that is used by system 102.

Secure ledger 114 may be implemented in a variety of ways. For example, secure ledger 114 can be implemented using a Blockchain, which can include a system in which a record of transactions made (e.g., timestamps and fingerprints or hash values stored) are maintained across multiple computers that are linked (e.g., in a peer-to-peer network or the like). In another example, secure ledger 114 may be implemented using a publicly available service that provides immutable records that are timestamped. For example, such a service may be a social media service, e.g., Twitter. Secure ledger 114 is configured to store a plurality of entries that each include a hash value associated with a subject document and are each associated with a timestamp. Secure ledger 114 is an immutable ledger, e.g., the hash value and the timestamp associated with a subject document cannot be changed once inserted into the secure ledger.

Figure 2:
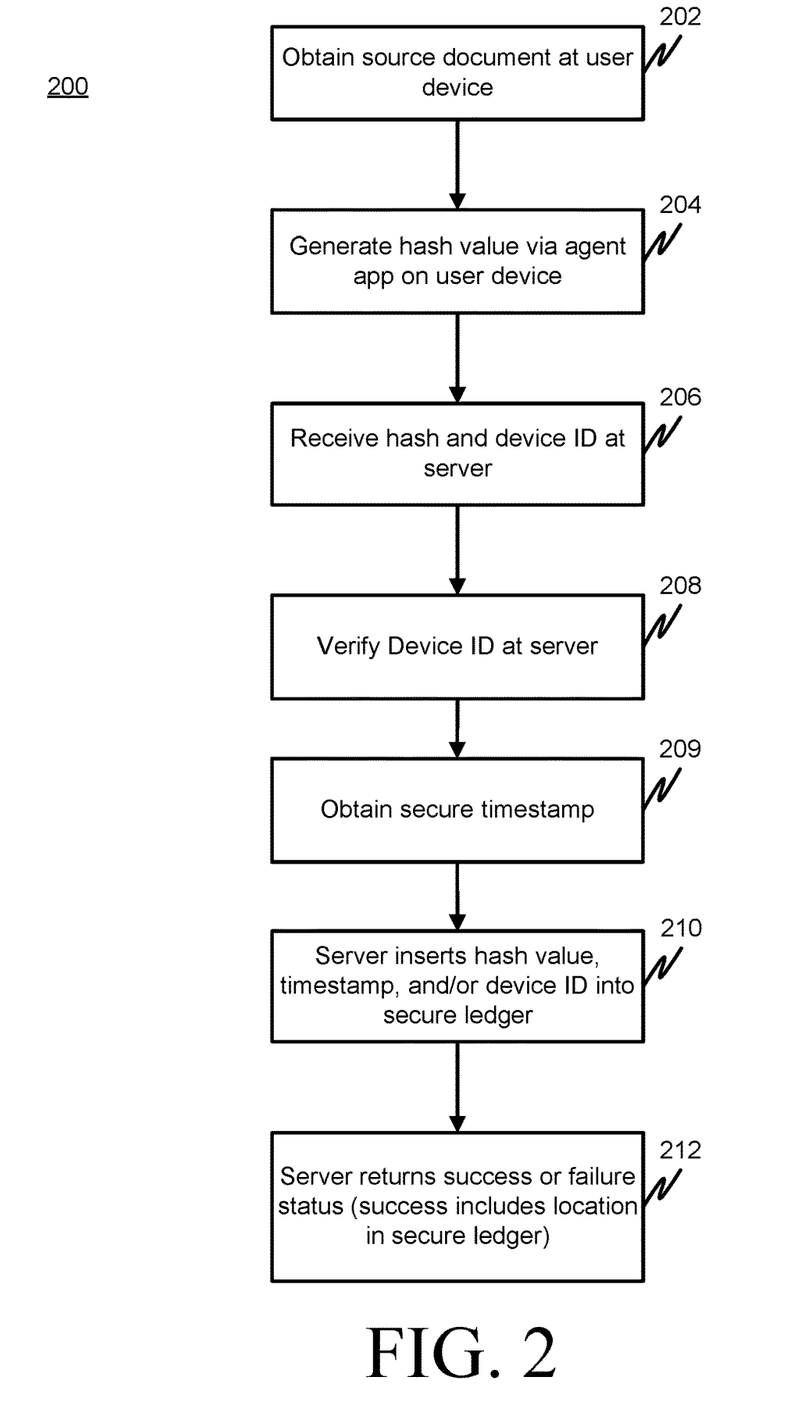
FIG. 2 is a flowchart of an example method to insert timestamp and authentication data associated with electronic documents into a secure ledger, in accordance with some implementations.

FIG. 2 is a flowchart of an example method 200 to timestamp and authenticate electronic documents, in accordance with some implementations. Processing begins at 202, where a source document (e.g., 110) (e.g., digital image or electronic file such as word processor or text file, PDF file, media file, spreadsheet or data base file) is obtained at a user device (e.g., 106). In some implementations, the source document can include an image that is obtained directly from a sensor of the user device such that the generated hash value (below at 204) is based on a raw image prior to any modification to the image by a user using the user device. Processing continues to 204.

At 204, a hash value (or fingerprint) is generated for the source document at the user device via the timestamp/authentication agent app (e.g., 108). The hash value is a cryptographic hash that is unique to the source document such that no two source documents correspond to the same hash value.

In some implementations an input byte stream of a source document (e.g., each byte of the document) is provided to a hashing algorithm which applies a mathematical function to the input stream to obtain a hash value that is unique to the source document, For example, the mathematical function can be a cryptographic hash function. The hashing algorithm is configured to return the same unique hash value for the source document each time it is provided as input. that has been hashed. Further, the hashing algorithm is configured to produce unique hash values for each source document that is provided as input.

A document that is hashed and is associated with an initial hash value, will have a new unique hash value, if the document is modified, even if the modifications is as minute as a single bit change. The hashing algorithm is selected such that it has a very low chance of collision—where two documents, regardless of how very different or how almost identical, produce the same hash. For example, the probability of collision can be in the range of 1 in $2^{128}$ or still lower. Processing continues to 206.

At 206, the hash value and a device identifier (or ID) is transmitted from the user device and received at a timestamp and authentication server (e.g., 102). Processing continues to 208.

Figure 3A:
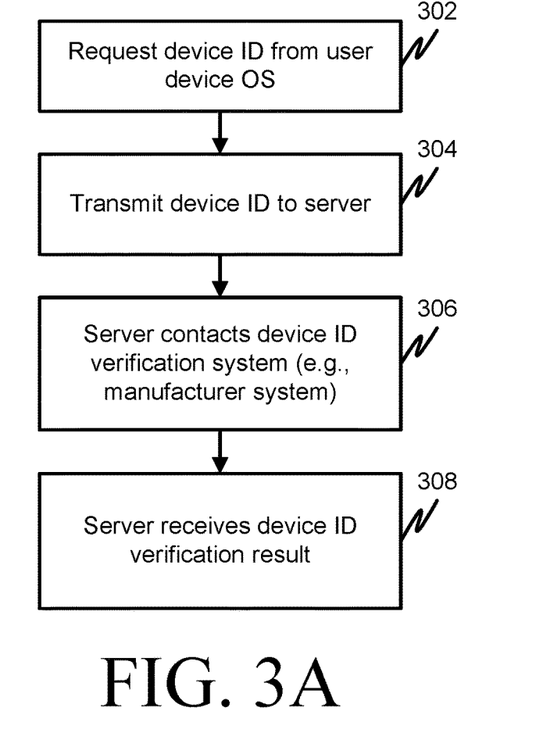
FIGS. 3A and 3B are flowcharts of example methods to verify device identifiers, in accordance with some implementations.
Figure 3B:
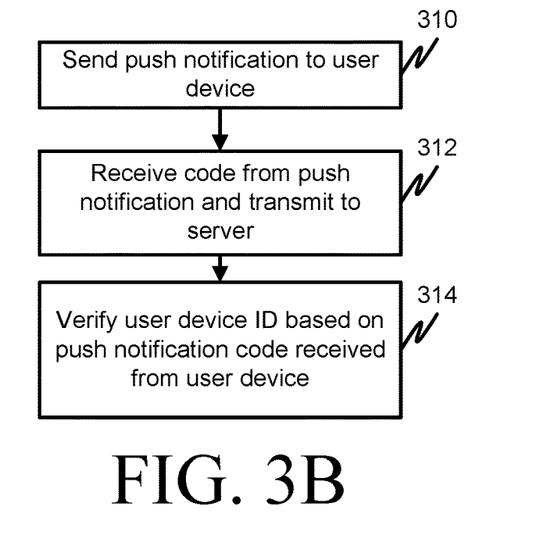

At 208, the server verifies the device ID. This can be performed in a number of ways. Two example methods of verification of the device ID are shown in FIGS. 3A and 3B and described below. Processing continues to 210.

At 209, the server optionally obtains a trusted time from a trusted time source (e.g., 116). For example, the trusted time source may be a network time server (e.g., that implements network time protocol), GPS, atomic clock, or the like. Processing continues to 210.

At 210, the server inserts the hash value into a secure ledger (e.g., 114). In some implementations, the hash value can be 32 bytes, 48 bytes or larger depending on the hashing algorithm used. In general, a higher size of the hash value can be more collision. Typically, it may not be necessary to use hash values of greater than 64 bytes. However, higher size hash values can be used, e.g., for greater security, and to protect against attacks using future generation computers, e.g., quantum computers.

In some implementations, only the document hash is inserted into the secure ledger. The position of the hash in the ledger is indicative of its temporal relation to other items in the ledger. However, some ledger systems such as blockchain, can also have a time attached to the ledger entries. In some implementations, the timestamp can be added as an additional field.

In some implementations, other identifying information, such as a device or user ID, can be added to the information stored in the secure ledger depending on one or more factors such as whether the user was authenticated using biometrics or a password, whether the document was generated on the device without tampering, whether a recipient of the document with the particular hash, acknowledged or approved of that document, etc. These fields can be used to provide additional services, without requiring separate storage that may be at risk for tamper or hacking. Processing continues to 212.

At 212, the server returns a status (e.g., success or failure) to the user device. If the status is success, the server also returns the location in the secure ledger where the hash value (and/or other data) was stored and can optionally return the timestamp obtained at 209. In some implementations, the location can include a URL (e.g., to access the blockchain location), or it could be a blockchain receipt. In the case of using a social network such as Twitter, for example, a link to the tweet can serve as a locator of the timestamp.

It will be appreciated that 202-212 can be repeated in whole or in part, or in a different order.

FIGS. 3A and 3B are flowcharts of example methods to timestamp and authenticate electronic documents in accordance with some implementations. FIG. 3A is a flowchart of an example device ID verification for an Apple device. FIG. 3B is a flowchart of an example device ID verification process for an Android device.

The process of FIG. 3A begins at 302, where the agent app requests the user device ID from the user device operating system (OS). The user device OS can include an interface call that provides the device ID to the agent app when requested. The device ID can include an IMEI number, a MAC address, an identifier generated by the device operating system based on one or more hardware identifiers (e.g., IMEI, MAC, UUID, etc.), or other suitable device identifier (e.g., secure, unique identifier). Processing continues to 304.

At 304, the user device transmits the device ID to the timestamp/authentication server. The device ID can be sent separately or as part of a message including other data items such as the hash value. Processing continues to 306.

At 306, the server contacts a device ID verification system to verify the device ID. For example, a device or operating system manufacturer may provide a device ID verification service. The server can contact the device ID verification service and provide the device ID and optionally other information relevant for device ID verification. Processing continues to 308.

At 308, the server receives a device ID verification result from the device ID verification service indicating whether the device ID is verified or not.

The process of FIG. 3B begins at 310, where a push notification is sent to a user device. The push notification can be sent from the server or from a third-party device verification service. The push notification can contain a code, which can include a numeric code (e.g., a four-digit number or a six-digit number, etc.) or an alphanumeric code (e.g., one or more letters, numbers, or symbols). Processing continues to 312.

At 312, at the user device, the code is received from the push notification and returned to the server. The receiving and returning of the code can be an automatic process or a process in which a user views the code and enters it into an interface to transmit the code to the server. Processing continues to 314.

At 314, the server (or a third-party verification service) verifies the user device ID based on a comparison of the code sent in the push notification and the code (response code) received from the user device. If the code sent in the push notification matches the code (response code) received from the user's device, the user device ID is verified. If the code sent in the push notification does not match the code received from the user device, the user device ID is not verified.

In some implementations, the device verification technique can include a mechanism to verify that the client software is actually running on a closed and tamper-resistant smart phone by taking a token generated by the OS that is explicitly and securely generated for the client software, and passing that token to the server, in a secure manner, and having the timestamp and authentication server verify the validity of that token directly with a third-party service (e.g., the manufacturer of the OS), then the server can determine with a degree of certainty that the client software is intact and running on the smartphone. In some implementations, communications between the user device timestamp and authentication application (agent app) and the timestamp and authentication server can use the above-mentioned token system to help ensure that the communications are secure. For example, the timestamp and authentication server can verify the token with each communication received form the user device, and only accept messages when the token is able to be verified (e.g., with the third-party verification service).

Figure 4:
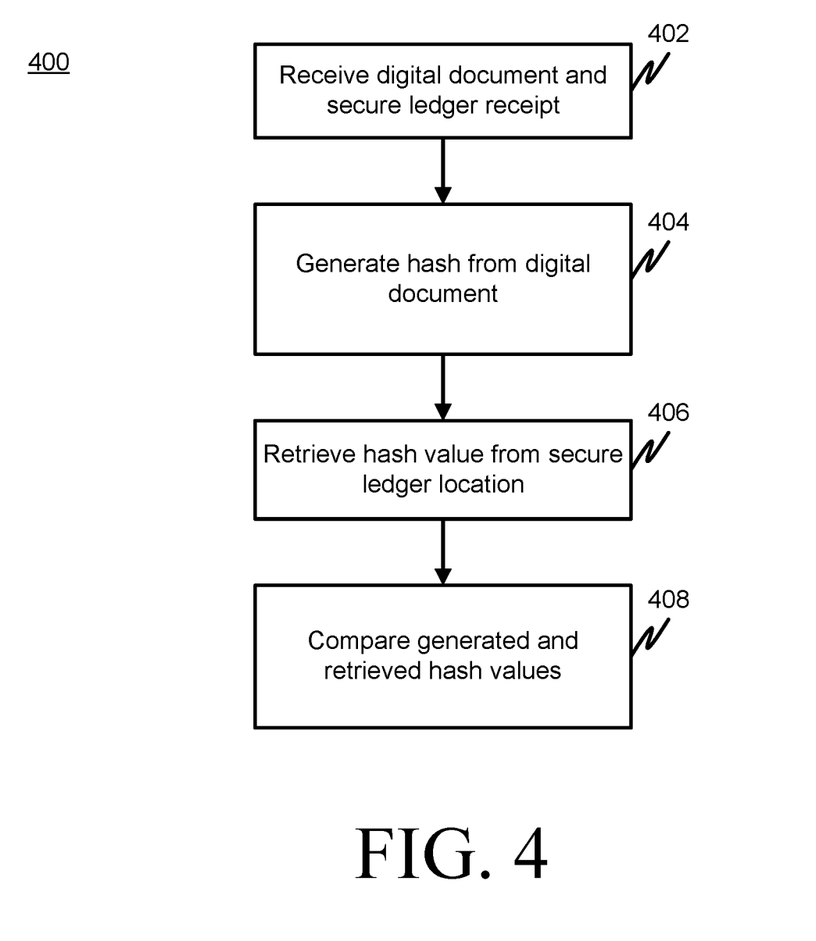
FIG. 4 is a flowchart of an example method to verify electronic documents, in accordance with some implementations.

FIG. 4 is a flowchart of an example method 400 to timestamp and authenticate electronic documents in accordance with some implementations. Processing begins at 402, where a digital document and a secure ledger receipt (or a portion thereof) are received. Processing continues to 404.

At 404, a hash value is generated from the digital document using the same technique employed by the timestamping and authentication agent application. Processing continues to 406.

At 406, a stored hash value is retrieved from the secure ledger using a location in the secure ledger receipt information. Processing continues to 408.

At 408, the generated hash value and the hash value retrieved from the secure ledger are compared. If the values are the same, the digital document is authentic in the sense that it is the same as the digital document that was initially timestamped and had its information entered into the secure ledger.

Figure 5:
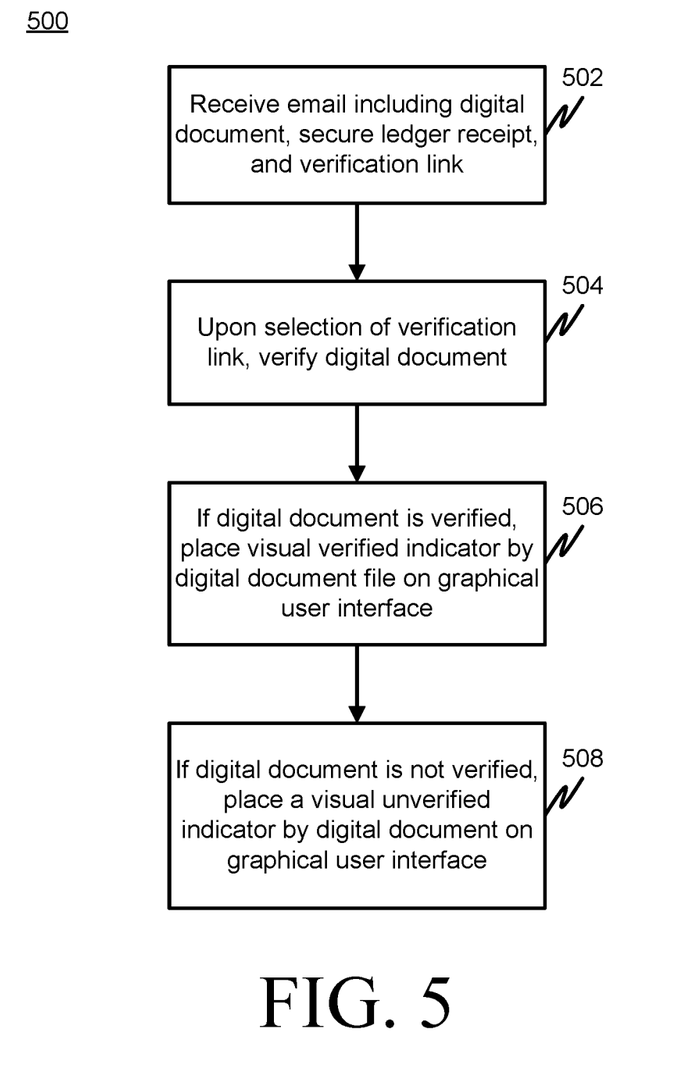
FIG. 5 is a flowchart of an example method to display a visual indicator of electronic document verification, in accordance with some implementations.

FIG. 5 is a flowchart of an example method to timestamp and authenticate electronic documents in accordance with some implementations. Processing begins at 502, where an email is received that includes a digital document, a secure ledger receipt (or portion thereof), and a verification link (e.g., a URL to connect to a timestamp/authentication server). Processing continues to 504.

At 504, upon selection of the verify link, the user's device establishes a connection with the timestamp/authentication server to verify the digital document. The user device can send the digital document and the secure ledger receipt (or portion thereof) to the timestamp/authentication server. The server can perform an authentication process (e.g., similar to 400 shown in FIG. 4) and return an authentication result to the user device. Processing continues to 506.

At 506, if the authentication result is that the digital document is authentic, then a visual verification indicator (e.g., a graphical symbol such as a green check mark or other indicium) is displayed near the digital document in a graphical user interface to provide a visual indication of authentication.

At 508, if the digital document is not verified, a visual "not verified" indicator (e.g., a red X or other indicium indicating non-verification) is placed near the digital document in a graphical user interface to provide a visual indication of not authenticated status.

Figure 6:
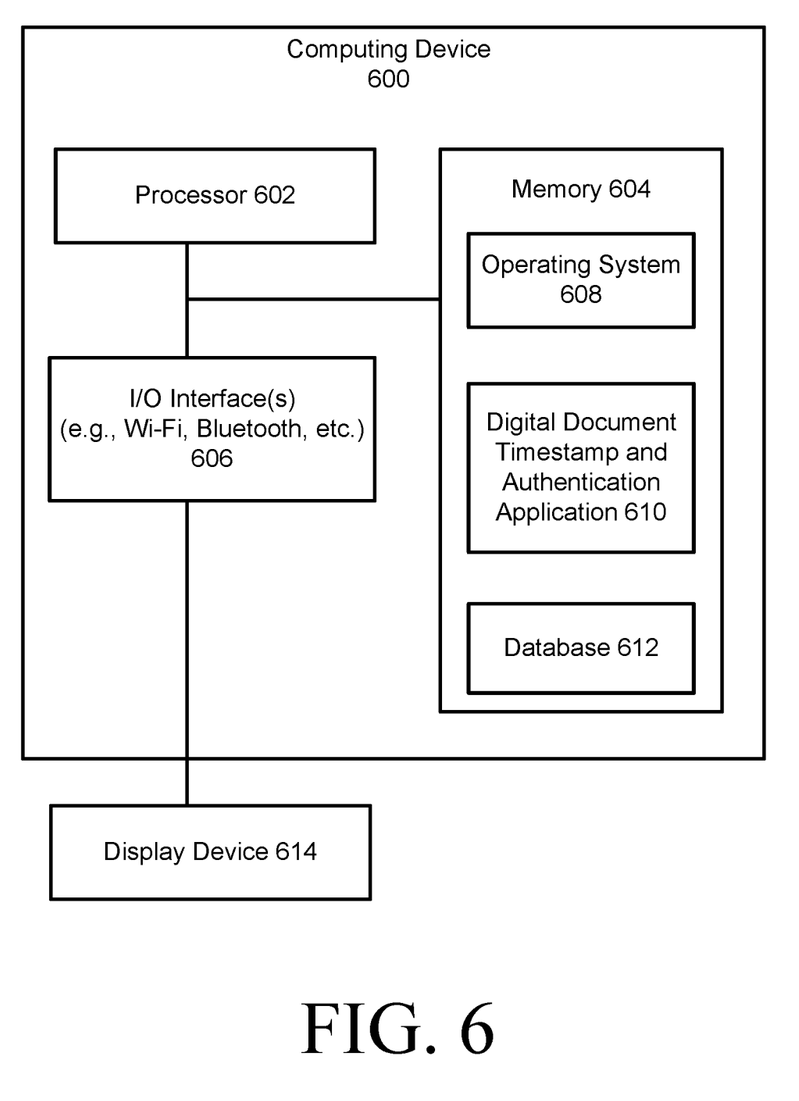
FIG. 6 is a diagram of an example system configured to timestamp and authenticate electronic documents, in accordance with some implementations.

FIG. 6 is a block diagram of an example computing device 600 which may be used to implement one or more features described herein. In one example, computing device 600 may be used to implement a computer device, e.g., a user device or a timestamp/authentication system (e.g., 102 and/or 106 of FIG. 1) and perform appropriate method implementations described herein. Device 600 can be any suitable computer system, server, or other electronic or hardware device. For example, the device 600 can be a mainframe computer, desktop computer, workstation, portable computer (including a smart phone or laptop), or medical device. In some implementations, device 600 includes a processor 602, a memory 604, and input/output (I/O) interface 606, all operatively coupled to each other.

Processor 602 can be one or more processors and/or processing circuits to execute program code and control basic operations of the device 600. A "processor" includes any suitable hardware and/or software system, mechanism, or component that processes data, signals, or other information. A processor may include a system with a general-purpose central processing unit (CPU), multiple processing units, dedicated circuitry for achieving functionality, or other systems. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, e.g., random access memory (RAM), read-only memory (ROM), electrical erasable read-only memory (EEPROM), flash memory, etc., suitable for storing instructions for execution by the processor, and located separate from processor 602 and/or integrated therewith. Memory 604 can store software operating on the server device 600 by the processor 602, including an operating system 608, one or more applications 610, e.g., a digital (or electronic) document timestamp and authentication application. In some implementations, applications 610 can include instructions that, in response to execution by processor 602, enable processor 602 to perform or control performance of the functions described herein, e.g., some or all of the methods of FIGS. 2-5.

For example, application 610 can include a digital (or electronic) document timestamp and authentication application, which as described herein can securely timestamp and store information about the digital document in order to authenticate the digital document and/or timestamp. Any of software in memory 604 can alternatively be stored on any other suitable storage location or computer-readable medium. In addition, memory 604 (and/or other connected storage device(s)) can store images, and other instructions and data used in the features described herein. Memory 604 and any other type of storage (magnetic disk, optical disk, magnetic tape, or other tangible media) can be considered "storage" or "storage devices."

I/O interface 606 can provide functions to enable interfacing the computing device 600 with other systems and devices. For example, network communication devices, storage devices (e.g., memory and/or database), and input/output devices can communicate via the I/O interface 606. In some implementations, the I/O interface 606 can connect to interface devices including input devices (keyboard, pointing device, touchscreen, microphone, camera, scanner, etc.) and/or output devices (display device, speaker devices, printer, motor, etc.). Display device 614 can be connected to device 600 via local connections (e.g., display bus) and/or via networked connections and can be any suitable display device, some examples of which are described below.

For ease of illustration, FIG. 6 shows one block for each of processor 602, memory 604, I/O interface 606, and software blocks 608 and 610. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. While timestamp/authentication system 102 and user device 106 are described as performing operations as described in some implementations herein, any suitable component or combination of components of 102, 106 or a similar system, or any suitable processor or processors associated with such a system, may perform the operations described.

A user device can also implement and/or be used with features described herein. Example user devices can be computer devices including some similar components as the device 600, e.g., processor(s) 602, memory 604, and I/O interface 606. An operating system, software, and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device 614, for example, can be connected to (or included in) the device 600 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., the methods shown in FIGS. 2-5) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. field-programmable gate array (FPGA), complex programmable logic device), general purpose processors, graphics processing units (or GPUs) application specific integrated circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device, laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Note that the functional blocks, operations, features, methods, devices, and systems described in the present disclosure may be integrated or divided into different combinations of systems, devices, and functional blocks. Any suitable programming language and programming techniques may be used to implement the routines of particular implementations. Different programming techniques may be employed, e.g., procedural, or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

EXAMPLE IMPLEMENTATIONS AND OPERATIONS

In one example, a user takes a photo (or photos) of an ongoing event using an implementation of the disclosed subject matter on the user's smartphone. The photos (which in this case are source documents) can be timestamped and have authentication data stored in a secure ledger (e.g., as shown in FIG. 2 and described above). The photo(s) and corresponding secure ledger receipts can be sent to a news agency. The news agency can verify (e.g., using the verification method described above in connection with FIG. 4) not only the time and date that the photo was taken, but also that the photo is unaltered from the original data that the phone's camera recorded.

In another example, a US company wishes to learn about the sourcing of parts for their factory. They wish to have daily photos sent to them, showing the flow of raw material and the progress through the supplier's warehouse or processing facility. Instead of flying a trusted employee over, they can hire an untrusted individual, not necessarily highly trained, and task them to use a smartphone with an implementation of the timestamp/authentication app described herein. This individual would then visit the supplier and photograph the required areas, timestamp the images (e.g., according to FIG. 2), which are source documents in this example, and the images and secure ledger receipts could automatically be sent to the US company. The US company can verify the authenticity of the images and the time taken (e.g., via the technique of FIG. 4), in order to gain confidence in their supplier.

In yet another example, a person is buying a car from another person and an implementation can provide an electronic document of standard legal template for the car sale. One of the two will initially fill out their information into the electronic document template. The electronic document template is sent to the other person as a contract. The other person fills out their relevant information electronically and provides the smartphone passcode or biometrics to accept the terms and sends it back to the first person. The first person countersigns contract using their passcode or biometrics, and the contract electronic document has been executed. The executed version of the contract electronic document can be timestamped and have its fingerprint (or hash value) stored in a secure ledger (e.g., according to FIG. 2). Both users will have a final copy of their contract available to them in the app or optionally sent to them in other forms. The executed electronic document contract can later be verified using a technique similar to that shown in FIG. 4 and described above.

In still another example, the HR department of a small company maintains paper copies of employee reports. However, due to the perceived ease in creating reports "as needed", an implementation of the disclosed system can be configured to take an image of paper documents as electronic or digital source documents, along with any text a user would like to add, and have the documents and text timestamped (e.g., according to process similar to that shown in FIG. 2 and described above). This could help prevent a future accusation that the reports were all created in haste in order to support "a wrongful termination," for example.

In another example, an inventor can document their invention, as simply as taking a photo of any daily or hourly progress, along with schematic diagrams, text write-ups, source code and anything else that resides in any kind of file, with their smartphone, as electronic or digital source documents. The documentation can be timestamped as described herein (e.g., as shown in FIG. 2). This could replace the traditional "inventors' notebook" and allow for a solid history of the invention for use defensively, or as part of a patent application.

In another example, a songwriter may wish to submit musical notation files that comprise their latest composition to a band. The songwriter can confidently do so, as their creation will have been timestamped (e.g., as shown in FIG. 2), and it can be proven that any presumed derivative work that the band publishes has a creation date that pre- or post-dates the timestamp (e.g., via the verification process of FIG. 4).

Some implementations can include an inspection app that is readily available to the public or a closed group, to permit users to gather and transmit inspection photos (i.e., source documents) back to an interested party, where the photos are authentic (e.g., as verified by a technique similar to that shown in FIG. 4), and have been location and time stamped (e.g., using a technique similar to that shown in FIG. 2).

The app creates the trust that the users of the app may not have yet achieved with the interested party. For example, a US company wishes to have an inspection of a Chinese factory's work conditions. The company commissions an unknown or less known individual to go through the factory and take photos. The individual can download a timestamp and authentication app from the app stores. While that individual may not be vetted or trusted, the app provides trust-worthy output (e.g., that has been timestamped according to process similar to that shown in FIG. 2) that can be verified as untampered (e.g., using a process similar to that shown in FIG. 4). This way, the user can provide authentic photos that are tagged with unalterable time and location stamps back to the company.

Some implementations can include a mechanism that allows for a code, a key, a file, or a visual code such as a barcode, to be received the user of the app (via messaging, electronic or otherwise), that would direct the app where to submit the resultant photos for the interested party or parties. This can help prevent error and constrains the app regarding who the images are shared with, while also indicating specific locations, geofences, and number and format/type of images that should be captured.

Some implementations can include a patrol app that can be distributed to patrolling agents representing, loosely or as direct agents, where these agents send location data and/or images from certain spots along a patrol route, which can then be timestamped using a process similar to that shown in FIG. 2. Due to the authentication of the location and times, this data can be proof that the patrolling agent was at those locations at the times recorded (and images to go along, if desired), and can be verified using a process similar to that shown in FIG. 4.

Some implementations can include a mechanism that allows for a code, a key, a file, or a visual like a barcode, to be sent to the agent, that would have the app instruct the agent on the planned route of patrol, possibly even specifying required times to be at certain points, the point to go to next, and the action to take at each point (take a photo, press a button, make contact with individuals, etc.).

Some implementations can include a photojournalism app to permit news organizations to be sent photos as source documents taken via the app from unvetted, or relatively unknown, or any, photojournalists. Due to the authentication and time stamping processes, e.g., similar to those shown in FIGS. 4 and 2, respectively, the news organization can feel confident that the images were not tampered with or are not "fake news."

Some implementations can include a mechanism that allows for a code, a key, a file, or a visual like a barcode, to be sent to the user of the app, that, when scanned or entered, would direct the app to send its images to a particular news organization, where the images are timestamped prior to sending and possibly encrypted for receiving party's eyes only.

Some implementations can include a mobile app that provides authenticated self-images. Many people use pictures for online social profiles or the like. At times, those images may be dated or are images that were downloaded and are not accurate representations of the person's appearance. A photograph implementation of the disclosed timestamp and authentication techniques can provide authenticated photos (e.g., where the photos are the source documents and the photos are timestamped using a process similar to that shown in FIG. 2) along with the date the photo was taken as a visible or invisible label or watermark. Interested parties can independently verify that an image that has been timestamped according to the process described herein is a true representation of the recent appearance of the profile owner.

Some implementations can include a mechanism to prevent the app from taking photos of images to prevent a fraudulent or misleading photo to be presented as the user's true appearance. A number of mechanisms can be used to detect that a camera is taking an image of a live face, head or full body, vs taking a photo of a flat image, such as light reflection patterns, alignment of horizontal or vertical focus points, frame to frame changes of inter-eye distance and location other facial features can detect a real subject from an image, and/or features of the smartphone useful for face recognition or AR, such as IR emitters or LIDAR can be used to detect depth.

The photograph timestamping and authenticating functionality can be useful for dating sites, social networks, and/or online services needing real identities and appearance images, such as DMV, RealID or FAA, among other applications.

What is claimed is:

1. A computer-implemented method to timestamp and authenticate electronic documents, the method comprising:
receiving, by a timestamp and authentication server and from a user device, a unique hash value that is generated at the user device based on a source document and a device identifier of the user device, wherein the source document includes a raw image that is obtained directly from a sensor of the user device such that the generated hash value is based on the raw image prior to any modification to the image by a user using the user device;
verifying, by the timestamp and authentication server, the device identifier;
upon verifying the device identifier, inserting, by the timestamp and authentication server, the hash value and the device identifier into a secure ledger, wherein the secure ledger includes a blockchain distributed ledger; and
upon successful insertion into the secure ledger, transmitting, from the timestamp and authentication server to the user device, a success status message including a location in the secure ledger where the hash value was inserted.

2. The method of claim 1, wherein the source document includes one or more of an image, a text document, computer software code, a video, a database, or a spreadsheet.

3. The method of claim 1, wherein generating the hash value includes generating a cryptographic hash value that is unique to the source document such that no two source documents correspond to a same hash value.

4. The method of claim 1, wherein inserting the hash value and the device identifier into the secure ledger comprises saving the hash value as a post to a public social media platform that maintains a respective timestamp for each post.

5. The method of claim 1, wherein verifying the device identifier includes:
transmitting, by the timestamp and authentication server, the device identifier to a third-party device identifier verification service; and
receiving, by the timestamp and authentication server, a device identifier verification result from the third-party device identifier verification service.

6. The method of claim 1, wherein verifying the device identifier includes:
sending a push notification to the user device, wherein the push notification contains a code;
receiving a response code from the user device; and
comparing the code with the response code, wherein the device identifier is verified if the code and the response code match and is unverified if the code and the response code do not match.

7. A system, comprising:
one or more hardware processors coupled to a computer readable memory having stored thereon software instructions that, when executed by the one or more hardware processors, cause the one or more hardware processors to perform or control performance of operations including:
receiving, from a user device, a unique hash value that is generated at the user device based on a source document and a device identifier of the user device, wherein the source document includes a raw image that is obtained directly from a sensor of the user device such that the generated hash value is based on the raw image prior to any modification to the image by a user using the user device;
verifying the device identifier;
upon verifying the device identifier, inserting the hash value into a secure ledger, wherein the secure ledger includes a blockchain distributed ledger; and
when the insertion into the secure ledger is successful, transmitting, to the user device, a success status message including a location in the secure ledger where the hash value was inserted.

8. The system of claim 7, wherein the source document includes one or more of an image, a text document, computer software code, a video, a database, or a spreadsheet.

9. The system of claim 7, wherein generating the hash value includes generating a cryptographic hash value that is unique to the source document such that no two source documents correspond to a same hash value.

10. The system of claim 7, further comprising saving the hash value as a post to a public social media platform that maintains a respective timestamp for each post.

11. The system of claim 7, wherein verifying the device identifier includes:
transmitting the device identifier to a third-party device identifier verification service; and
receiving a device identifier verification result from the third-party device identifier verification service.

12. The system of claim 7, wherein verifying the device identifier includes:
sending a push notification to the user device, wherein the push notification includes a code;
receiving a response code from the user device; and
comparing the code with the response code, wherein the device identifier is verified if the code and the response code match and is unverified if the code and the response code do not match.

13. The system of claim 7, wherein the operations further include obtaining a timestamp from a time source, and wherein the inserting further includes inserting one or more of the timestamp or the device identifier into the secure ledger.

14. The system of claim 13, wherein the secure ledger includes a social network having a sequential streams of entries that cannot be altered or reordered.

* * * * *